United States Patent [19]

Kessick et al.

[11] Patent Number: 4,521,383
[45] Date of Patent: * Jun. 4, 1985

[54] LIME ADDITION TO HEAVY CRUDE OILS PRIOR TO COKING

[75] Inventors: Michael A. Kessick; Zacharia M. George; Linda G. Schneider, all of Edmonton, Canada

[73] Assignee: Alberta Research Council, Edmonton, Canada

[*] Notice: The portion of the term of this patent subsequent to Jun. 4, 2002 has been disclaimed.

[21] Appl. No.: 157,939

[22] Filed: Jun. 9, 1980

[30] Foreign Application Priority Data

Jun. 8, 1979 [GB] United Kingdom ............... 7920001

[51] Int. Cl.$^3$ .......................................... C01G 31/00
[52] U.S. Cl. ................................. 423/68; 208/126; 208/127; 423/150
[58] Field of Search ............... 208/127, 126; 423/63, 423/150, 68

[56] References Cited

U.S. PATENT DOCUMENTS

| | | | |
|---|---|---|---|
| 514,041 | 2/1894 | Schwahn | 75/101 R |
| 2,364,390 | 12/1944 | Schaafsma | 208/226 |
| 2,953,518 | 9/1960 | McKinley et al. | 208/149 |
| 3,300,276 | 1/1967 | Bretschneider et al. | 423/68 |
| 3,707,462 | 12/1972 | Moss | 208/127 |
| 3,907,662 | 9/1975 | Kubota et al. | 208/127 |
| 3,915,844 | 10/1975 | Ueda et al. | 208/127 |
| 3,923,635 | 12/1975 | Schulman et al. | 208/127 |
| 4,169,038 | 9/1979 | Metrailer et al. | 208/127 |
| 4,216,197 | 8/1980 | Moss | 423/638 |
| 4,243,639 | 1/1981 | Haas et al. | 423/68 |

OTHER PUBLICATIONS

Kirk-Othmer, Encyclopedia of Chemical Technology, Second Edition, vol. 12, Interscience Publishers (1967), pp. 417-419.

Primary Examiner—John Doll
Assistant Examiner—Wayne A. Langel
Attorney, Agent, or Firm—Sim & McBurney

[57] ABSTRACT

The sulphur emissive capability, on combustion, of coke which is formed during upgrading of sulphur-containing heavy crude oils, including oil sands bitumen, or residua is decreased by the addition of slaked lime or calcium oxide to the heavy crude oil prior to coking. The presence of the slaked lime or calcium oxide leads to an increased yield of liquid distillates at coking temperatures of about 450° to about 500° C. Ash remaining after combustion of the coke may be leached to recover nickel and vanadium values therefrom.

1 Claim, 1 Drawing Figure

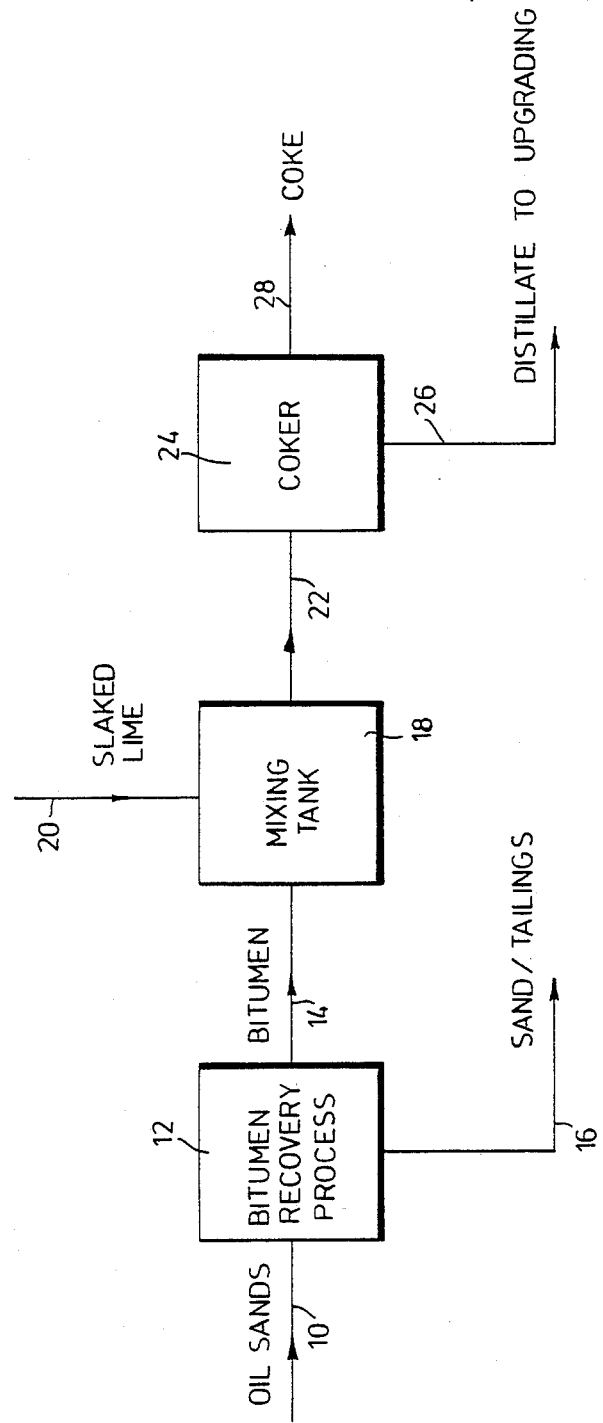

LIME ADDITION TO HEAVY CRUDE OILS PRIOR TO COKING

FIELD OF INVENTION

The present invention is directed to the formation of improved coke in the upgrading of heavy crude oils including bitumen recovered from oil sands.

BACKGROUND OF THE INVENTION

There are major accumulations of oil sands at a number of global locations, including Canada, United States and Venezuela. Oil sands are basically a mixture of bitumen, mineral and water of variable bitumen content. Only those surficial deposits of the Athabasca region of Alberta, Canada are being exploited on a commercial scale at this time. In the deposits, the bitumen content varies up to about 18 wt.% and averages about 12 wt.%, water is usually about 3 to about 6 wt.% and the mineral content, predominantly quartz, ranges from about 84 to about 86 wt.%.

At the present time there is one commercial procedure for the recovery of bitumen from these deposits, known as the "hot water" process, although other procedures have been suggested. The recovery procedures attempt to separate the bitumen from the oil sand. The recovered bitumen is subjected to upgrading operations to form a synthetic crude oil.

The initial step of such upgrading operation is to subject the bitumen to a coking step. The coking step involves evaporating off volatiles from the bitumen to leave a solid carbonaceous material, known as "coke". The quantity of coke formed may vary, and is usually in the range of about 10 to 25 wt.% of the bitumen.

The coke so formed has a high sulphur content, usually about 5.5 to 6 wt.%, which can be oxidized to sulphur dioxide. The sulphur content of the coke inhibits its use as a source of thermal energy, unless elaborate and expensive sulphur dioxide removal equipment is used in association with the combustion gas stream.

Other heavy crude oils, which do not have substantial proportions of minerals associated therewith, and residua are also subjected to a initial coking step in upgrading the same, to result in sulphur-containing coke. Such heavy crude oils and residua are characterized by an API (American Petroleum Institute) gravity value of less than 25°, usually less than 20°, and occur in substantial deposits in Western Canada, California and the Orinoco basin in Venezuela.

SUMMARY OF THE INVENTION

It has now been surprisingly found that the emission of sulphur dioxide on combustion of coke formed in heavy crude oil and residua upgrading can be decreased significantly, so as to enable the coke more readily to be used as a source of thermal energy.

In accordance with the present invention, calcium oxide or calcium hydroxide is added to the bitumen prior to coking, in controlled quantities and specific process conditions are used in the coking step.

GENERAL DESCRIPTION OF INVENTION

The calcium oxide or calcium hydroxide is added to the heavy crude oil generally in powdered dry form and thoroughly intermixed therewith prior to coking. Owing to handling difficulties associated with calcium oxide, it is preferred to use calcium hydroxide (hereinafter referred to as "slaked lime") as the additive compound. Hereinafter the invention will be described with particular reference to the use of calcium hydroxide as the additive compound. The slaked lime may be formed from pure lime or from lime formed from a natural source, such as limestone.

The presence of the additive compound in the heavy oil only affects sulphur which is present in the coke after coking and prevents the formation of sulphur dioxide therefrom upon combustion of the coke. The additive compound does not in any way affect the concentration of sulphur which is present in the liquid distillate and which must be removed during further upgrading.

The mechanism whereby the present invention is able to decrease sulphur emissions on coke combustion is theorized to be as follows. On heating during coking, the sulphur forms calcium sulphide with the calcium hydroxide. Upon combustion of the coke, the calcium sulphide is oxidized to form calcium sulphate, rather than breaking down to form sulphur dioxide.

The quantity of additive compound used depends on the degree of sulphur removal desired. Minor quantities are effective in achieving some decrease in the sulphur dioxide formed on combustion and the degree of decrease increases with increasing quantities of additive, until further additions confer no additional benefit.

The present invention is concerned with significantly decreasing the proportion of sulphur which is oxidized to sulphur dioxide on combustion of the coke while at the same time making economic use of the additive compound. Accordingly, the quantity of additive used is restricted to a somewhat narrow range of quantities which correspond to molar ratio of calcium to sulphur in the bitumen of about 1 to 3 to about 1 to 1, preferably about 1 to 2 for oil sands bitumen. These molar ratios correspond to quantities by weight of slaked lime of about 3 to about 7 wt.%, preferably about 5 wt.%.

The coking may be effected in any desired manner, such as, delayed coking or fluid coking, but within a restricted temperature range. The coking temperature must be within the range of about 450° to about 500° C., preferably about 460° C. If coking is effected below about 450° C., then excessive quantities of slaked lime are required to achieve a substantial sulphur emissions decrease, while temperatures above about 500° C. tend to favour the formation of substantial quantities of incondensible gaseous products of the combustions, which is considered undesirable.

An additional beneficial effect which has been observed when slaked lime or calcium oxide is added to the heavy crude oil prior to coking is that the yield of liquid distillates from the coking is increased, as compared with the absence of the additive.

Yet another benefit which results from the addition of slaked lime or calcium oxide to the heavy crude oil prior to coking is that the quantity of hydrogen sulphide in the coker gas decreases with increasing concentrations of additive and is practically eliminated at higher values. This result is highly desirable when the coker gas is to be used as a gaseous fuel.

Heavy crude oils usually contain amounts of valuable metals, mainly nickel and vanadium. These metals are present in ash formed upon combustion of the coke. Heretofore attempts to recover such metals from the ash have been generally unsuccessful and involve complicated and expensive procedures, especially with respect to the recovery of nickel.

It has been found that when slaked lime or calcium oxide is added to the heavy crude oil, the heavy crude oil is subsequently coked, and the coke is combusted, then nickel and vanadium can be extracted substantially quantitatively from the ash remaining from the combustion by leaching of the ash with hydrochloric acid. The metals then are recovered from the leach solution.

BRIEF DESCRIPTION OF DRAWING

The accompanying drawing is a schematic flow sheet of one embodiment of the procedure of the invention as applied to oil sands.

DESCRIPTION OF THE EMBODIMENT

Referring to the drawing, oil sands are fed by line 10 to a bitumen recovery process 12, such as, the hot water process, which results in bitumen in line 14 and sand and tailings for discard in line 16. The bitumen in line 14 is passed to a mixing tank 18 wherein it is intimately mixed with slaked lime which is fed thereto by line 20. A diluting solvent may also be added to render the bitumen more tractable.

The mixture, after recovery of any diluent solvent, is forwarded by line 22 to a coker 24 wherein volatiles are driven off and the liquid distillates are forwarded by line 26 for further upgrading to form synthetic crude oil. The coke, having a decreased tendency to form sulphur dioxide on combustion, is recovered by line 28.

EXAMPLES

EXAMPLE I

This Example illustrates the use of slaked lime and calcium oxide in decreasing sulphur emissions on combustion of coke formed from oil sands bitumen.

Samples of oil sands bitumen extracted from Athabasca oil sands were mixed respectively with slaked lime and calcium oxide in amounts sufficient to provide a molar ratio of Ca:S in the bitumen of 1 to 2. The samples were coked at about 475° C. in a laboratory coker to form coke. Untreated samples were also coked. The volume of liquid distillates obtained was measured in each case.

The coke samples were combusted in air at about 1000° C. and the amount of sulphur dioxide emitted was determined. The results are reproduced in the following Table I:

TABLE I

| Additive | Amount Used wt. % on Bitumen | SO$_2$ Release From Coke wt. % S on coke | Liquid Distillates wt. % on bitumen |
|---|---|---|---|
| O | — | 5.9 | 75.7 |
| Ca(OH)$_2$ | 4.88 | 1.1 | 79.7 |
| CaO | 3.66 | 0.75 | 78.1 |

The results of the above Table I demonstrate that the sulphur dioxide release from the coke is substantially decreased when slaked lime or calcium oxide are added to the bitumen prior to coking. In addition, a significant increase in liquid distillates is achieved.

EXAMPLE II

This Example illustrates the effect of quantities and coking temperature on results attained.

The procedure of Example I was repeated for various samples with differing quantities of slaked lime and some samples were coked at 430° C. and other samples were coked at 475° C. The results are reproduced in the following Table II:

TABLE II

| Coking Temperature | | | | | | | |
|---|---|---|---|---|---|---|---|
| 475° C | | | | 430° C. | | | |
| Amount Used wt. % on bitumen | Ca:S Mole Ratio (Approx.) | SO$_2$ Release From Coke wt. % S on Coke | Liquid Distillate Yield wt. % on Bitumen | Amount Used wt. % | Ca:S Mole Ratio (Approx.) | SO$_2$ Release From Coke wt. % | Liquid Distillate Yield wt. % Bitumen |
| 0 | — | 5.9 | 75.7 | 0 | — | 5.9 | 75.7 |
| 0.75 | | | 77.0 | | | | |
| 1.8 | 1:4 | 4.2 | 78.2 | 2.0 | 1:4 | 3.6 | 72.5 |
| 3.5 | 1:3 | 2.9 | 79.8 | 4.76 | 1:2 | 3.01 | 74.4 |
| 4.8 | 1:2 | 1.1 | 79.7 | 9.0 | 1:1 | 1.92 | 74.0 |
| | | | | 16.7 | 2:1 | 0.23 | 74.2 |

The results of the above Table II demonstrate that significantly lower quantities of slaked lime are required with coking at 475° C. to decrease the sulphur emissions as compared with coking at 430° C. and that an increase in the yield of liquid product is attained only with coking at 475° C.

Determination of the sulphur content of the liquid phase showed that there was not much difference between the value at a coking temperature of 475° C. (3.0 wt.%) and a coking temperature of 430° C. (2.8 wt.%). The value remained constant irrespective of the quantity of slaked lime added.

EXAMPLE III

This Example illustrates the effect of coking temperature on yield of liquid products.

The procedure of Example I was repeated for samples of bitumen to which slaked lime had been added in an amount corresponding to a mole ratio of Ca:S of about 1:2 (i.e. about 4.8 wt.% Ca(OH)$_2$) with the coking being effected at various temperatures. The results are reproduced in the following Table III:

TABLE III

| Coking Temperature | Liquid Distillate yield wt. % on bitumen |
|---|---|
| 442° C. | 73.3 |
| 455° C. | 77.4 |
| 460° C. | 79.3 |
| 475° C. | 79.7 |
| 475° C. (No additive) | 75.7 |

The results of the above Table III show that an increase in liquid distillate yield is attainable only at coking temperatures above 450° C. The increase in the yield increases rapidly at coking temperatures from 450° to 460° C. and then levels off above that temperature.

EXAMPLE IV

This Example illustrates the distribution of sulphur in the various phases with increasing proportions of slaked lime addition to the bitumen.

The procedure of Example I was repeated on samples of bitumen to which slaked lime had been added in varying proportions, with the coking being effected at 475° C. The distribution of the total sulphur of the bitumen into the distillate, coke (combustible S), coker gas and ash (as $SO_4^=$) phases was determined for each sample and the results are reproduced in the following Table IV:

TABLE IV

| wt. % $Ca(OH)_2$ on bitumen | Sulphur Distribution (wt. % of total in bitumen) | | | |
|---|---|---|---|---|
| | Distillates | Coke | Coker gas | Ash |
| 0 | 57 | 19 | 24 | |
| 2 | 57 | 14 | 11 | 18 |
| 3.5 | 60 | 11 | 10 | 19 |
| 5 | 58 | 4 | 3 | 35 |

It will be seen from the above Table IV that the sulphur content of the liquid product remains substantially constant while the combustible sulphur in the coke and the sulphur contents of the coker gas diminish substantially with increasing slaked lime additions.

EXAMPLE V

This Example compares typical data obtained using the procedure of this invention with commercial bitumen coking procedures.

Samples of bitumen to which 4.8 wt.% $Ca(OH)_2$ were added were coked at 475° C. and various determinations made. The results were compared with effecting the same coking in the absence of added slaked lime and also with the results known to be obtained by Suncor Ltd. and Syncrude Ltd. in their oil sand bitumen upgrading procedures. The results are reproduced in the following Table V:

TABLE V

| | Laboratory Scale | | Commercial Operations | |
|---|---|---|---|---|
| | Inventive Process | No Additive | Suncor | Syncrude |
| Coke Yield (wt. % on bitumen) | 13 | 13 | 20 to 25 | 15 |
| S in coke which can form $SO_2$ (wt. % on coke) | 1.0 | 6.0 | 6.0 | 6 to 8 |
| Distillate Yield (wt. % on Bitumen) | 80 | 75 | 70 | 77 |
| % S in distillate | 3.1 | 3.1 | 3.3 | 3.7 |
| API of bitumen | 17 | 17 | 26 | 22 |
| Coke volatile content | 21[1] | 16.1 | 10 | 7.3 |
| Heat capacity of coke BTU/lb × $10^3$ | 10.3 | 14.3 | 13.7 | 12.8 |
| Ash (wt. % on coke) | 47[2] | 5.5 | 3.7 | 8.6 |

Notes:
[1]This result appears to be anomalous
[2]Contains substantial quantities of calcium sulphate.

The results of the above Table V show that the present invention significantly decreases the sulphur emissive capability of the coke while not significantly adversely affecting the thermal capacity of the coke. The yield of liquid distillate is improved while the sulphur content thereof remains substantially unaffected.

EXAMPLE VI

This Example illustrates the recovery of nickel and vanadium from coke ash.

Samples of ash from the combustion at 1000° C. of coke produced at 475° C. from oil sands bitumen to which 4.8 wt.% $Ca(OH)_2$ had been previously added, were leached with 1M hydrochloric acid for 1 hour. One sample was leached at 25° C., a second sample was leached at 65° C. and a third sample waas leached at 100° C. The results are reproduced in the following Table VI:

TABLE VI

| Leach Temperature °C. | Estimated % Recovery | |
|---|---|---|
| | Ni | V |
| 25 | 46 | 100 |
| 65 | 55 | 100 |
| 100 | 66 | 100 |

It will be seen from the results of the above Table VI that vanadium is leached readily both at high and low temperatures while nickel required the higher temperature to achieve significant dissolution.

Attempts were made to leach vanadium and nickel from the ash resulting from the combustion at 1000° C. of coke resulting from commercial and laboratory oil sands bitumen coking procedures. In these experiments, the leach temperature was 75° C. and 1M HCl again was used. The results are set forth in the following Table VII.

TABLE VII

| Ash Source | % Recovery | |
|---|---|---|
| | Ni | V |
| Suncor Ltd. | 1.4 | 40 |
| Syncrude Ltd. | 0.8 | 32 |
| Laboratory (No additive) | 0.6 | 36 |
| Laboratory (4.8 wt. % $Ca(OH)_2$) | 51 | 90 |
| Laboratory (3.7 wt. % CaO) | 44 | 94 |

The results of the above Table VII demonstrate that much lower recoveries of vanadium and very low recoveries of nickel are achieved in the absence of addition of slaked lime or calcium oxide to the bitumen prior to coking.

No detectable recovery was attained using 0.1N HCl for leaching for 1 hour ash resulting from the combustion of coke formed from bitumen to which slaked lime was first added.

SUMMARY OF DISCLOSURE

In summary of this disclosure, the present invention provides a procedure for decreasing the sulphur emissive capability of heavy crude oils coke, including oil sands bitumen coke, on combustion. Modifications are possible within the scope of the invention.

What we claim is:

1. A process for the recovery of nickel and vanadium values from a heavy oil or residua having an API gravity value of less than 25° and containing nickel, vanadium and sulphur, which comprises:
   (a) mixing a calcium compound selected from the group consisting of calcium hydroxide and calcium oxide with said heavy crude oil or residua prior to coking in an amount sufficient to give a molar ratio of calcium to sulphur in the heavy crude oil or residua of about 1:3 to about 1:1;
   (b) effecting coking of said heavy crude oil at a temperature of about 450° C. to about 500° C. to produce a coke;
   (c) combusting said coke to produce an ash;
   (d) leaching said ash with hydrochloric acid to dissolve nickel and vanadium values therefrom, and
   (e) recovering said nickel and vanadium values from the leach liquor.

* * * * *